(12) United States Patent
Lorenz

(10) Patent No.: US 12,416,518 B2
(45) Date of Patent: Sep. 16, 2025

(54) MEASURING TUBE FOR A THROUGHFLOW MEASURING DEVICE, THROUGHFLOW MEASURING DEVICE AND METHOD FOR PRODUCING A MEASURING TUBE

(71) Applicant: Endress+Hauser Flowtec AG, Reinach (CH)

(72) Inventor: Rainer Lorenz, Lörrach (DE)

(73) Assignee: Endress+Hauser Flowtec AG, Reinach (CH)

( * ) Notice: Subject to any disclaimer, the term of this patent is extended or adjusted under 35 U.S.C. 154(b) by 452 days.

(21) Appl. No.: 18/002,396

(22) PCT Filed: Jun. 16, 2021

(86) PCT No.: PCT/EP2021/066266
§ 371 (c)(1),
(2) Date: Dec. 19, 2022

(87) PCT Pub. No.: WO2021/255106
PCT Pub. Date: Dec. 23, 2021

(65) Prior Publication Data
US 2023/0228606 A1    Jul. 20, 2023

(30) Foreign Application Priority Data
Jun. 19, 2020   (DE) .............. 10 2020 116 301.0

(51) Int. Cl.
*G01F 15/00* (2006.01)
*G01F 15/14* (2006.01)
*G01F 15/18* (2006.01)

(52) U.S. Cl.
CPC ............ *G01F 15/006* (2013.01); *G01F 15/14* (2013.01); *G01F 15/18* (2013.01)

(58) Field of Classification Search
CPC ......... G01F 15/006; G01F 15/14; G01F 15/18
USPC ........................................... 73/273
See application file for complete search history.

(56) References Cited

FOREIGN PATENT DOCUMENTS

| DE | 102004048765 A1 | | 4/2006 | |
|---|---|---|---|---|
| DE | 102004053065 A1 | | 5/2006 | |
| DE | 102004057695 A1 | | 6/2006 | |
| DE | 102009030904 A1 | * | 12/2010 | ........... G01F 1/8468 |
| DE | 102013114742 A1 | | 6/2015 | |
| DE | 102014113543 A1 | | 3/2016 | |

(Continued)

OTHER PUBLICATIONS

Translation of DE-102009030904-A1 (Year: 2010).*
Translation of WO-2009096360-A1 (Year: 2009).*
Translation of JP-H09126843-A (Year: 1995).*

*Primary Examiner* — Nathaniel T Woodward
(74) *Attorney, Agent, or Firm* — Mark A. Logan; Endress+Hauser (USA) Holding, Inc.

(57) ABSTRACT

A measuring tube for a flow measuring means includes an essentially cylindrical measuring tube section that is composed of tantalum on at least the interior surface. At least one insert composed essentially of a noble metal is inserted into one of two end openings such that the interior surface of tantalum is in direct contact with the noble metal. In this way, hydrogen embrittlement of the measuring tube is very easily reduced. Further disclosed is a flow measuring device having a measuring tube of the invention as well as a method for producing such a measuring tube.

14 Claims, 2 Drawing Sheets

(56) References Cited

FOREIGN PATENT DOCUMENTS

| GB | 819618 | | 9/1959 | | |
|----|--------|---|--------|---|---|
| GB | 941983 | | 11/1963 | | |
| JP | 52159653 | U | 12/1977 | | |
| JP | H09126843 | A  * | 10/1995 | | |
| WO | WO-2009096360 | A1  * | 8/2009 | ............... | G01F 1/58 |

* cited by examiner

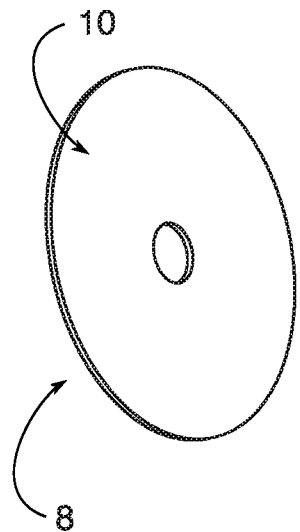
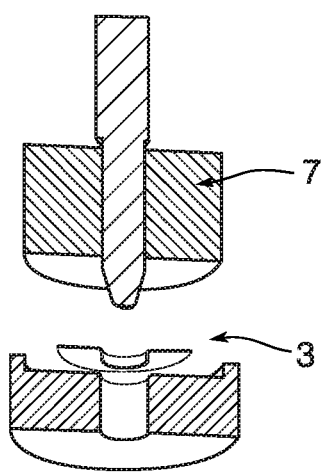
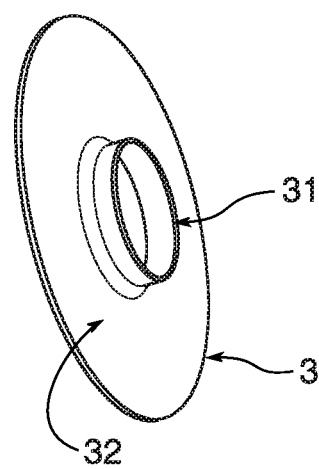
Fig. 3a Fig. 3b Fig. 3c
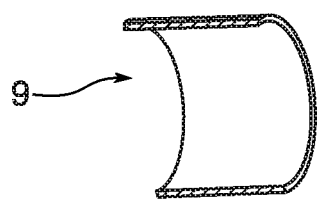
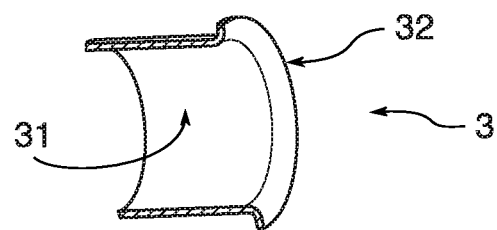
Fig. 3d Fig. 3e
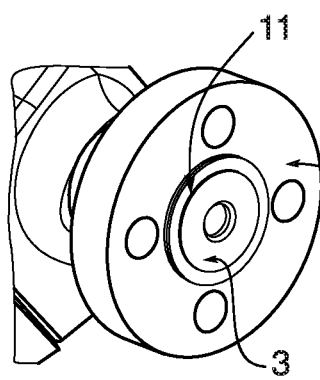
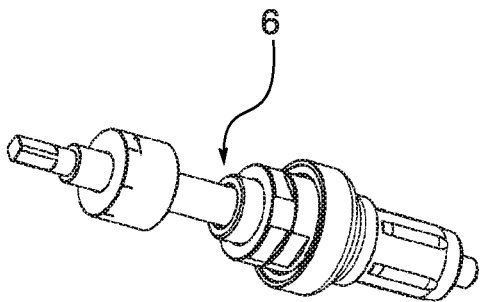
Fig. 4

MEASURING TUBE FOR A THROUGHFLOW MEASURING DEVICE, THROUGHFLOW MEASURING DEVICE AND METHOD FOR PRODUCING A MEASURING TUBE

CROSS-REFERENCE TO RELATED APPLICATIONS

The present application is related to and claims the priority benefit of DPMA Patent Application No. 10 2020 116 301.0, filed on Jun. 19, 2020 and International Patent Application No. PCT/EP2021/066266, filed on Jun. 16, 2021, the entire contents of which are incorporated herein by reference.

TECHNICAL FIELD

The invention relates to a measuring tube for a flow measuring device, which flow measuring device is embodied for determining and/or monitoring a process variable of a liquid medium, wherein the liquid medium flows through the measuring tube in the determining and/or monitoring of the process variable. The invention relates, furthermore, to a flow measuring device as well as to a method for producing a measuring tube, especially a measuring tube of a flow measuring device.

BACKGROUND

In automation technology, especially in process automation technology, flow measuring devices are often applied as field devices for determining and/or monitoring process variables. The terminology, field devices, refers, in such case, in principle, to all devices, which are applied near to a process and deliver, or process, process relevant information. Flow measuring devices have, in such case, typically, a measuring tube, which in the determining and/or monitoring of the process variable is flowed through by a fluid, especially liquid, medium, whose process variable is determinable by means of the flow measuring device.

Known from the state of the art and described in corresponding publications are a large number of flow measuring devices, which work according to different measuring principles and include, for example, ultrasonic, thermal, magnetically inductive, vortex- and Coriolis-flow measuring devices. Typically, at least the flow of the medium flowing through the measuring tube is determined. Moreover, in given cases, also other process variables are determinable by means of flow measuring devices, for instance, viscosity and/or density in the case of a Coriolis flow measuring device. Such a Coriolis flow measuring device having a single measuring tube is described, for example, in DE 10220827 A1 and EP 1502085 B1.

The measuring tube must, in such case, be designed in such a manner that it has an adequate chemical resistance for the medium flowing through the measuring tube. For the case of a strongly acidic medium, consequently, often a measuring tube of tantalum is used, since tantalum has a high acid resistance. Such is due to the forming of a protective oxide layer on the surface of tantalum. At the same time, tantalum is a material of high mechanical durability.

For a long term mechanical durability, however, so-called hydrogen embrittlement presents a challenge for tantalum. This refers to an embrittlement caused by the penetration and inclusion of hydrogen in a material. Hydrogen embrittlement occurs, when atomic hydrogen reaches the surface of a material. Atomic hydrogen diffuses faster into the material than does the non-diffusion capable $H_2$ molecule. The atomic hydrogen diffused into the material gives rise to hydrogen related crack formation and eventual brittle fracture of the material.

For the case of a measuring tube of tantalum, which is in contact with an acidic medium, hydrogen embrittlement represents an especially large challenge in the case of small material thickness, for example, in the case of small diameters and/or thicknesses of the measuring tube. Investigations of the applicant show that, in such case, almost all failures of measuring tubes can be attributed to cracks and/or brittle fracture induced by hydrogen embrittlement.

Different approaches are described in the literature for preventing, or at least reducing, hydrogen embrittlement in the case of tantalum. One approach is to couple tantalum with a more noble metal. In this way, the binding of hydrogen ions (H+) to tantalum can be reduced. This approach is discussed, for example, in the article "A Method for Prevention of Hydrogen Embrittlement of Tantalum in Aqueous Media", CORROSION 1961; 17(8):379t-385t. It is observed that it is sufficient for preventing hydrogen embrittlement to provide a comparatively small contact area of the tantalum with the more noble material. This effect is independent of whether pure tantalum or, as in practice, tantalum with an oxide layer is present. See e.g. "Platinum implantation into tantalum for protection against hydrogen embrittlement during corrosion", Nuclear Instruments and Methods in Physics Research Section B, 2012, 272: 441-445.

SUMMARY

An object of the invention, therefore, is to design a measuring tube of tantalum as simply as possible to be mechanically durable.

The object is achieved by a measuring tube for a flow measuring device and by a method for producing a measuring tube for a flow measuring device.

Regarding the measuring tube, the object is achieved by a measuring tube for a flow measuring device, which flow measuring device is embodied for determining and/or monitoring a process variable of a liquid medium, wherein the liquid medium flows through the measuring tube in the determining and/or monitoring of the process variable, comprising:

An essentially cylindrical measuring tube section, through which a liquid medium can flow and which is composed of tantalum at least on an interior surface, wherein the cylindrical measuring tube section includes two oppositely lying end openings for inflow and outflow of the medium;

at least one insert, which is composed essentially of a noble metal, wherein the insert is inserted into one of the two end openings in such a manner that the interior of tantalum is in direct contact with the noble metal.

According to the invention, thus, an insert is provided, which is inserted from an end opening of the cylindrical measuring tube section into the cylindrical measuring tube section. There results at at least one of the openings (i.e. at the first, inlet opening or at the second, outlet opening) a direct contact of the tantalum with the more noble material, thus the noble metal. As a result of the direct contact, there is an electrically conductive connection between the two substances, such that they are electrochemically coupled.

In the context of this application, the term "tantalum" includes both the pure element as well as also the pure element with an alloying component under 10% weight-percent, as well as tantalum (with or without an alloying component) with a thin oxide layer arranged thereon. As already indicated above, in practice, an oxide layer is always present.

A significant advantage of the solution with the insert of the noble metal is that by means of the insert the tantalum can be brought very easily into contact with the noble metal. For example, the insert can also be inserted subsequently for retrofitting in the case of an already existing measuring tube. For preventing the hydrogen embrittlement, it is, in such case, sufficient that the contact between the tantalum and the noble metal be present only in one region of the interior.

In an embodiment of the measuring tube, the first opening and the second opening each widen to a circularly shaped end face, for connecting of the measuring tube with a process connection. The circularly shaped end faces are formed, for example, by washers welded to the cylindrical measuring tube section. They each form, consequently, for example, a part of a pipe flange, with which the measuring tube is connectable at the first opening and at the second opening, in each case, to a flange of a process connection.

The terminology, "composed essentially of a noble metal", means within the scope of the invention that the insert is composed of a pure noble metal or a noble metal alloy, wherein any non-noble metal part amounts to less than 20% weight-percent. Of course, the insert can also comprise an alloy of two different noble metals.

In an embodiment of the measuring tube, the insert is composed of a sleeve shaped section and a circular flange shaped section.

In an embodiment of the measuring tube, the sleeve shaped section of the insert extends from the opening into the cylindrical measuring tube section and the interior surface of the cylindrical measuring tube section is in direct contact with the exterior surface of the sleeve shaped section, and wherein the circular flange shaped section bears on the circularly shaped end face of the opening. Because the circular flange shaped section bears on the circularly shaped end face, the insert is secured to the cylindrical measuring tube section, and to the opening.

In an embodiment of the measuring tube, the insert is one piece and is formed by means of tension compression forming, especially a flanging, of a piece of sheet metal. "One piece" means according to the invention that the insert is composed of one piece and can be inserted as such into the cylindrical measuring tube section.

Especially, the insert formed by means of a flanging tool, thus, flanged.

The insert is formed, for example, from a circularly shaped piece of sheet metal, for example, a disk having a bore, i.e. a washer, or a sleeve shaped piece of sheet metal. The material thickness of the circularly shaped piece of sheet metal or the sleeve shaped piece of sheet metal amounts, for example, to less than 1 mm, especially to less than 0.6 mm.

In an embodiment of the measuring tube, the noble metal of the insert is selected from the group of platinum metals, which comprises ruthenium (Ru), rhodium (Rh), palladium (Pd), osmium (Os), iridium (Ir) and platinum (Pt). Especially, the noble metal is platinum.

In an embodiment of the measuring tube, the noble metal of the insert has a Vickers hardness (VH), which is less than or equal to 200 VH. Such soft noble metals are easily formable, such that, for example, the tension compression forming is as simple as possible. Furthermore, pressing a "soft" insert against the cylindrical measuring tube section results especially easily in a mechanically durable and liquid sealed connection between insert and cylindrical measuring tube section. The hardness of the cylindrical measuring tube section is influenced, for example, by its alloying ingredients and/or final treatment, for example, a work hardening, for example, by forging.

In an embodiment of the measuring tube, the insert is pressed mechanically against the opening, which results in a mechanical, especially non-releasable, connection between the cylindrical measuring tube section and the insert.

The insert is pressed into the cylindrical measuring tube section, for example, using a rolling tool. The rolling tool includes, for example, a rotating conical mandrel, which by rolling presses the insert against the interior of the cylindrical measuring tube section with an outwardly directed force.

In an embodiment of the measuring tube, the mechanical connection between the cylindrical measuring tube section and the insert is embodied as a liquid sealed connection.

The mechanical connection is, thus, free of additional sealing elements and, without such, embodied liquid tightly sealed against a liquid medium. The liquid medium flows through the measuring tube in the case of an intended use and the above mentioned process variable (the flow, viscosity and/or density) is determinable for the medium with the flow measuring device.

In an embodiment of the measuring tube, the cylindrical measuring tube section of the measuring tube has a wall thickness less than 1 mm and an outer diameter less than 25 mm. The problem of hydrogen embrittlement occurs, above all, in the case of such thin, small measuring tubes.

In an embodiment of the measuring tube, the sleeve shaped section of the insert extending into the cylindrical measuring tube section amounts in its longitudinal direction to at least 0.1 times, especially at least 0.15 times, an outer diameter of the cylindrical measuring tube section. In this way, it is assured that the electrically conductive contact between the noble metal insert and the cylindrical measuring tube section is present over a sufficiently large contact area.

In an embodiment of the measuring tube, two inserts are provided, one for each of the two end openings. All above embodiments involving the at least one insert are, of course, mutatis mutandis, also embodiments of the second insert, in the case of use of a first insert at the first end opening and a second insert at the second end opening.

The invention relates, furthermore, also to a flow measuring device, which is embodied for determining and/or monitoring a process variable of a fluid medium with a measuring tube of the invention, which measuring tube is applied in a housing of the flow measuring device.

An example of such a measuring device is a Coriolis flow measuring device. For details of the operation of a Coriolis flow measuring device, reference is made to the above mentioned state of the art.

Regarding the method, the object is achieved by a method for producing a measuring tube, comprising steps as follows:
  providing an essentially cylindrical measuring tube section, through which a liquid medium can flow and which is composed of tantalum on at least an interior surface, wherein the cylindrical measuring tube section includes two oppositely lying end openings for inflow and outflow of the medium,
  wherein the first opening and the second opening each widen to a circularly shaped end face, for connecting of the measuring tube with a process connection;

providing at least one insert, which is composed essentially of a noble metal;

inserting the insert into one of the two end openings in such a manner that the interior surface of tantalum is in direct contact with the noble metal;

pressing the insert against the opening in such a manner that a mechanically strong, especially non-releasable, connection is formed between the insert and the essentially cylindrical measuring tube section.

In an embodiment, the method includes a step as follows:

tension compression forming, especially flanging, a sleeve or a circular washer of a noble metal, whereby the insert with the sleeve shaped section and the circular flange shaped section is formed, and wherein the tension compression forming occurs before the inserting of the insert into the cylindrical measuring tube section.

The insert is, thus, provided by forming one piece of sheet metal in a deformation process.

In an embodiment of the method, the insert is mechanically pressed into the cylindrical measuring tube section by means of a rolling tool, whereby a mechanically strong, especially non-releasable and liquid sealed, connection between the insert and the cylindrical measuring tube section is produced.

In an embodiment of the method, before inserting the insert into the cylindrical measuring tube section, an adhesive, especially an epoxy adhesive, is applied on the insert, such that the insert is secured to the cylindrical measuring tube section by means of the adhesive before the production of the mechanically strong, pressed connection, and wherein the adhesive is applied on the insert at most in certain regions, such that the adhesive is present at most on a region between the circular flange shaped section of the insert and the circularly shaped end face of the opening.

Especially, a maximum of 20% of the contact area between the insert and the cylindrical measuring tube section is covered with adhesive.

The invention as well as other advantageous embodiments will now be explained in greater detail based on examples of embodiments. Equal parts are provided in all figures with equal reference characters; when perspicuity requires or it otherwise appears sensible, reference characters already shown in earlier figures are omitted in subsequent figures.

BRIEF DESCRIPTION OF THE DRAWINGS

The figures of the drawing show as follows:

FIGS. 3a-e show perspective views of embodiments of the insert of a measuring tube of the present disclosure;

FIG. 4 shows a perspective view illustrating production of a measuring tube of the present disclosure.

DETAILED DESCRIPTION

Figure 1:
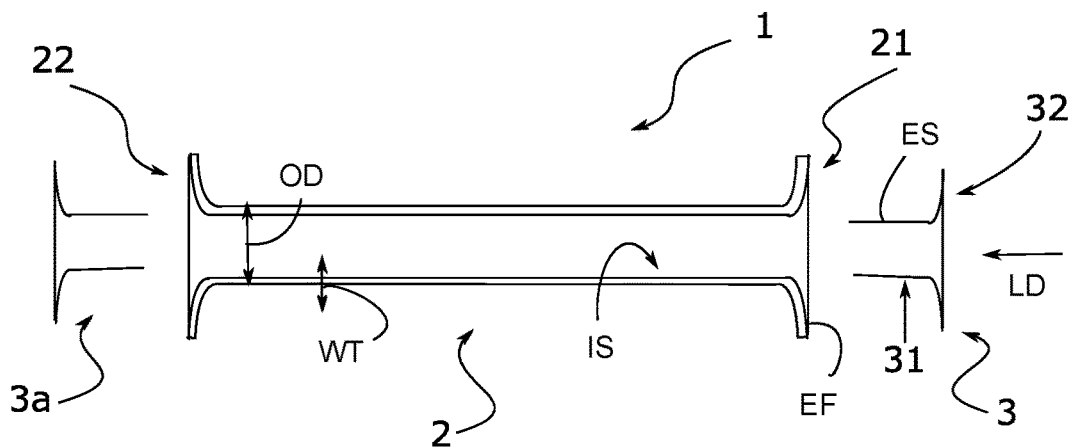
FIG. 1 shows an exploded view of an embodiment of a measuring tube of the present disclosure.

FIG. 1 shows the parts of an embodiment of a measuring tube 1 of the invention. This includes a cylindrical measuring tube section 2, which is composed of tantalum (or tantalum with a thin oxide layer) at least on its interior surface IS and which has two openings 21, 22 for the inflow and outflow of a liquid medium. The openings 21, 22 widen to circularly shaped end faces EF, for connecting the measuring tube 1 to a process connection, for instance, by means of a pipe flange.

The cylindrical measuring tube section 2 of the measuring tube 1 has an outer diameter OD of less than 25 mm and a wall thickness less than 1 mm. For sufficiently small and thin measuring tubes 1, investigations of the applicant have shown hydrogen embrittlement induced brittle fracture to be a problem.

According to the invention, this is counteracted by inserting an insert 3 into at least one of the openings 21, 22. In the illustrated example of an embodiment, an insert 3,3a is inserted in each openings 21, 22. For the sake of convenience, since insert 3a is the same as insert 3, only insert 3 will be described. Insert 3 is composed essentially of a noble metal NM and protrudes into the region of the cylindrical measuring tube section 2 that, in measurement operation, is flowed through by medium. The exterior surface ES of the insert 3 is, consequently, in direct contact with the interior surface IS, thus the tantalum of the cylindrical measuring tube section 2, which is exposed to an, in given cases, acidic and, therewith, hydrogen embrittlement promoting medium.

The protruding-in is accomplished in practice by the fact that the insert 3 has a sleeve shaped section 31 and a flange shaped section 32. The sleeve-shaped section 31 amounts in its longitudinal direction LD to at least the 0.1 times the outer diameter OD of the cylindrical measuring tube section 2 and of the measuring tube 1.

Figure 2A:
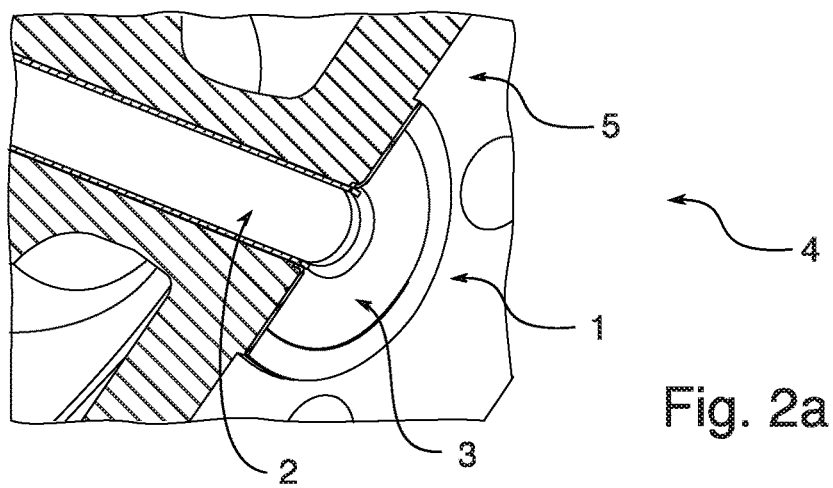
FIGS. 2a, 2b show perspective views of an embodiment of a measuring tube of the present disclosure in a housing of a flow measuring device.

Measuring tube 1 with the cylindrical measuring tube section 2 and the at least one insert 3 is installable, or installed (see FIGS. 2a and 2b), in a housing 5 of a flow measuring device 4.

A significant advantage of the insert 3 of the invention is that it can be inserted from the opening 21 leading to the pipe flange into the cylindrical measuring tube section 2 without problem. In this way, it is very easy to protect a flow measuring device 4 by inserting the insert 3 into the cylindrical measuring tube section 2 to couple the tantalum on the interior surface IS of the measuring tube 1 with the noble metal NM and, as a result, to reduce the hydrogen embrittlement.

Figure 2B:
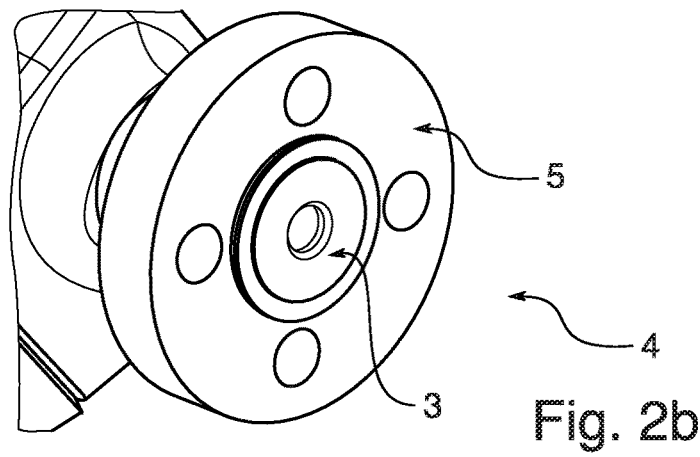

Especially, an already existing measuring tube installed in a housing 5 of a flow measuring device 4 without the insert of the invention can be retrofitted with an insert of the invention, in order to increase its longterm mechanical durability; see FIG. 2b.

Preferably, the shape of the insert 3 shown in FIG. 1 is obtained simply by a deformation process, for example, a flanging. FIGS. 3a to 3e show this in greater detail. The insert 3, composed of the sleeve shaped section 31 and the circular flange shaped section 32, is, for example, in a first embodiment, obtained by forming a piece of sheet metal 8 of a noble metal NM, in such case, platinum, in the form of a circular washer 10 (FIG. 3a) by means of a flanging tool 7, see FIG. 3b. The shape of the insert 3 shown in FIG. 3c is obtained by the tension compression forming occurring in the flanging.

Alternatively, of course, the piece of sheet metal 8 can also be provided in the form of a sleeve 9 as starting shape (FIG. 3d), in order to form from the sleeve 9 insert 3 with the circular flange shaped section 32 and the sleeve shaped section 31. See FIG. 3e.

In either case, a very cost effective solution for producing an insert 3 of a measuring tube 1 of the invention is provided by using a thin piece of sheet metal 8 in a standard form, such as a circular washer 10 or a sleeve 9 as starting shape for production of the insert 3.

Preferably, a soft piece of sheet metal 8 having a Vickers hardness of less than or equal to 200 HV is provided, in order to obtain therefrom the one piece insert 3 in a deformation process. This offers, on the one hand, the advantage that the deformation is embodied simply, and only small stresses are introduced into the material in the insert 3.

On the other hand, using such a soft platinum piece of sheet metal 8, also a liquid sealed connection between insert 3 and the cylindrical measuring tube section 2 can be obtained very easily; see FIG. 4.

For mechanical connecting of the cylindrical measuring tube section 2 with the insert 3, steps are performed as follows:

inserting the insert 3 into the cylindrical measuring tube section 2;

pressing a rolling tool 6 introduced from the opening 21 against the insert 3, whereby a mechanical and liquid sealed connection between the insert 3 and the cylindrical measuring tube section 2 is produced.

Because of the resulting mechanical connection, the tantalum of the interior surface IS of the cylindrical measuring tube section 2 and the platinum of the exterior surface ES of the insert 3 are directly in electrically conductive contact with one another. The sealing of the liquid tight connection occurs via the rolling and the resulting pressing of the soft Pt-insert 3, without a supplemental sealing element between the insert 3 and the cylindrical measuring tube section 2 being necessary.

For improved placement and securement of the insert 3 in the cylindrical measuring tube section 2, in given cases, an adhesive 11, for example, an epoxy adhesive, such as, for instance, a 2K epoxy adhesive, can be used. The adhesive is applied on the insert 3 before the inserting of the insert 3 and the pressing of the insert 3 against the cylindrical measuring tube section 2.

The adhesive 11 is especially applied at most in certain regions on the flange shaped section 32 of the insert 3, for example, only on an edge region adjoining the outer diameter; see FIG. 4. The adhesive takes up, for example, less than 20% of a contact area between the insert 3 and the cylindrical measuring tube section 2. In this way, upon the subsequent pressing, a liquid sealed, pressed mechanical connection is obtained, in the case of which tantalum is sufficiently in direct contact with platinum, in order to reduce the hydrogen embrittlement. Preferably, at least 1% of the interior surface IS of tantalum otherwise in contact with the medium is placed in contact with the noble metal NM (platinum in this example). In the case of application of two inserts 3,3a, one for each of the two openings 21, 22 for the inflow and outflow, at least a contact area of 180 mm^2 is present between the tantalum and the platinum of the example.

The invention claimed is:

1. A measuring tube for a flow measuring device that is embodied for determining and/or monitoring a process variable of a liquid medium, wherein the liquid medium flows through the measuring tube in the determining and/or monitoring of the process variable, the measuring tube comprising:

a cylindrical measuring tube section through which a liquid medium can flow and which is composed of tantalum at least on an interior surface, wherein the cylindrical measuring tube section includes two oppositely lying end openings for inflow and outflow of the medium; and at least one insert composed of a noble metal, or an alloy of the noble metal having less than 20% by weight any non-noble metal, wherein the noble metal is a platinum group metal, wherein the at least one insert is inserted into a first end opening of the two end openings such that the interior surface composed of tantalum is in direct electrically conductive contact with the noble metal, wherein the at least one insert is pressed mechanically against the first end opening which results in a mechanical, non-releasable connection between the cylindrical measuring tube section and the at least one insert, and wherein the mechanical connection between the cylindrical measuring tube section and the at least one insert is embodied as a liquid-sealed connection.

2. The measuring tube as claimed in claim 1, wherein the first end opening and a second opening of the two end openings each widens to a circularly shaped end face for connecting the measuring tube with a process connection.

3. The measuring tube as claimed in claim 2, wherein the at least one insert includes a sleeve-shaped section and a circular flange-shaped section.

4. The measuring tube as claimed in claim 3,
wherein the sleeve shaped section of the at least one insert extends from the end opening into the cylindrical measuring tube section and the interior surface of the cylindrical measuring tube section is in direct contact with an exterior surface of the sleeve-shaped section, and wherein the circular flange shaped section bears on the circularly shaped end face of the opening.

5. The measuring tube as claimed in claim 2, wherein the insert is one piece and is formed by a tension compression forming of a piece of sheet metal.

6. The measuring tube as claimed in claim 1, wherein the noble metal of the insert has a Vickers hardness that is less than or equal to 200 VH.

7. The measuring tube as claimed in claim 1, wherein the cylindrical measuring tube section has a wall thickness less than 1 mm and an outer diameter less than 25 mm.

8. The measuring tube as claimed in claim 1, wherein the sleeve-shaped section of the insert extending into the cylindrical measuring tube section amounts in its longitudinal direction to at least 0.1 times an outer diameter of the cylindrical measuring tube section.

9. The measuring tube as claimed in claim 1, wherein two inserts are provided, one for each of the two end openings.

10. A flow measuring device embodied for determining and/or monitoring a process variable of a fluid medium, comprising:

a measuring tube, wherein the liquid medium flows through the measuring tube in the determining and/or monitoring of the process variable, wherein the measuring tube includes:

a cylindrical measuring tube section through which a liquid medium can flow and which is composed of tantalum at least on an interior surface, wherein the cylindrical measuring tube section includes two oppositely lying end openings for inflow and outflow of the medium; and at least one insert composed of a noble metal, or an alloy of the noble metal having less than 20% by weight any non-noble metal, wherein the noble metal is a platinum group metal, wherein the at least one insert is inserted into a first end opening of the two end openings such that the interior surface composed of tantalum is in direct electrically conductive contact with the noble metal, wherein the at least one insert is pressed mechanically against the first end opening which results in a mechanical, non-releasable connection between the cylindrical measuring tube section and the at least one insert, and wherein the mechanical connection between the cylindrical measuring tube section and the at least one insert is embodied as a liquid-sealed connection; and a housing, wherein the measuring tube is applied in the housing of the flow measuring device.

11. A method for producing a measuring tube, comprising:

providing a cylindrical measuring tube section through which a liquid medium can flow, wherein the cylindrical measuring tube section is composed of tantalum on at least an interior surface, wherein the cylindrical measuring tube section includes a first and a second oppositely lying end openings for inflow and outflow of the medium, wherein the first end opening and the second end opening each widen to a circularly shaped end face for connection of the measuring tube with a process connection;

providing at least one insert which is composed of a noble metal, or an alloy of the noble metal having less than 20% by weight any non-noble metal, wherein the noble metal is a platinum group metal;

inserting the at least one insert into a first end opening of the two end openings such that the interior surface composed of tantalum is in direct electrically conductive contact with the noble metal;

pressing the at least one insert against the opening in such a manner that a mechanically strong, non-releasable, and liquid-tight sealed connection is formed between the at least one insert and the cylindrical measuring tube section.

12. The method as claimed in claim 11, further comprising:

tension compression forming a sleeve or a circular washer of the noble metal whereby the at least one insert with a sleeve-shaped section and a circular flange-shaped section is formed, wherein the tension compression forming occurs before the inserting of the insert into the cylindrical measuring tube section.

13. The method as claimed in claim 12, wherein the at least one insert is mechanically pressed into the cylindrical measuring tube section by a rolling tool whereby a mechanically strong, non-releasable, and liquid sealed connection between the at least one insert and the cylindrical measuring tube section is produced.

14. The method as claimed in claim 13, wherein, before inserting the at least one insert into the cylindrical measuring tube section, an adhesive is applied on the at least one insert such that the at least one insert is secured on the cylindrical measuring tube section by the adhesive before the production of the mechanically strong, pressed connection, and wherein the adhesive is applied on the insert in certain regions, and wherein the adhesive is present at most on a region between the circular flange shaped section of the insert and the circularly shaped end face of the opening.

* * * * *